(12) United States Patent
Ehrlich

(10) Patent No.: US 8,720,938 B2
(45) Date of Patent: May 13, 2014

(54) BIASING AIR SUSPENSION SYSTEM FOR A TRAILER

(71) Applicant: Rodney P. Ehrlich, Monticello, IN (US)

(72) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 13/662,958

(22) Filed: Oct. 29, 2012

(65) Prior Publication Data

US 2013/0140784 A1      Jun. 6, 2013

Related U.S. Application Data

(60) Provisional application No. 61/566,044, filed on Dec. 2, 2011.

(51) Int. Cl.
*B60G 5/00* (2006.01)
*B62D 63/06* (2006.01)
*B60G 11/27* (2006.01)

(52) U.S. Cl.
USPC .................. 280/683; 280/789; 280/124.16

(58) Field of Classification Search
USPC .............. 180/24.11; 280/5.514, 6.157, 6.159, 280/676, 678, 683, 789, 124.157, 124.16, 280/124.163
See application file for complete search history.

(56) References Cited

U.S. PATENT DOCUMENTS

| | | | | |
|---|---|---|---|---|
| 2,865,649 A * | 12/1958 | Chalmers et al. | ............. | 280/683 |
| 3,197,231 A * | 7/1965 | Holzman | ...................... | 280/683 |
| 5,374,077 A * | 12/1994 | Penzotti et al. | ............... | 280/683 |
| 6,308,793 B1 * | 10/2001 | Eberling | .................... | 180/24.02 |
| 6,523,625 B2 * | 2/2003 | Eberling et al. | .......... | 180/24.02 |
| 6,921,100 B2 | 7/2005 | Mantini et al. | | |
| 7,690,663 B2 * | 4/2010 | Haire | ..................... | 280/124.157 |
| 7,841,608 B2 * | 11/2010 | Morris et al. | ............ | 280/124.16 |
| 7,850,195 B2 * | 12/2010 | Simard et al. | ................ | 280/678 |
| 7,938,411 B2 * | 5/2011 | Stahl et al. | ................. | 280/5.514 |
| 8,424,892 B2 * | 4/2013 | Hapyuk et al. | ............ | 280/149.2 |
| 2009/0079146 A1 * | 3/2009 | Stahl et al. | ................. | 280/6.159 |

* cited by examiner

*Primary Examiner* — Toan To
*Assistant Examiner* — Laura Freedman

(57) ABSTRACT

An air suspension system of a tandem axle assembly for a trailer includes a front axle air spring configured to be coupled to a front axle assembly of the tandem axle assembly and a rear axle air spring configured to be coupled to a rear axle assembly of the tandem axle assembly. The air suspension system further includes an air reservoir in fluid communication with the front axle air spring and the rear axle air spring and a ratio valve in fluid communication with the air reservoir, the front axle air spring, and the rear axle air spring. The ratio valve is positioned between the air reservoir and the front axle air spring. Further, the ratio valve is selectively operable to send a lesser amount of air from the air reservoir to the front axle air spring than to the rear axle air spring.

17 Claims, 5 Drawing Sheets

BIASING AIR SUSPENSION SYSTEM FOR A TRAILER

This application claims priority under 35 U.S.C. §119(e) to U.S. Provisional Patent Application Ser. No. 61/566,044 filed Dec. 2, 2011 entitled BIASING AIR SUSPENSION SYSTEM FOR A TRAILER, the entirety of which is hereby incorporated by reference herein.

FIELD OF THE INVENTION

The present invention relates generally to an air suspension system for a tandem axle assembly of a semi trailer.

BACKGROUND

The weight of a semi trailer is oftentimes a factor in determining the cost of delivering a load for commercial purposes. For example, maximizing the load weight allows a truck company to ensure that the customer is assessed the full price for transporting the load. The weight of commercial trailers is also important from the perspective of public safety and highway maintenance. Overloading a commercial vehicle can create a hazard by reducing the truck's stability and braking ability. An overloaded trailer may also cause wear to the trailer itself as well as to the tractor towing the trailer. Therefore, it is important to maximize the load at or near the vehicle's maximum weight capacity within the trailer without exceeding the predetermined weight limitations.

Governments typically regulate vehicle weight by specifying a maximum legal load limit and fining vehicle operators for any overage. Governments also typically regulate the maximum weight supported by every axle assembly of a truck and/or trailer traveling over pavement. For example, one illustrative regulation requires that the maximum load on any single axle assembly of a trailer may not generally be greater than approximately 20,000 lbs while the maximum total load on a tandem axle assembly including two axle assemblies may not be greater than 34,000 lbs.

A trailer typically includes one or more axles, such as a tandem axle assembly, including two axle assemblies, mounted on a suspension slider so it can be moved back and forth relative to the storage container of the trailer. By moving the suspension slider back and forth along a length of the trailer, the cargo weight can be distributed between the axle assemblies on the trailer and the tractor to prevent any single axle assembly from exceeding the maximum weight limit. For example, when the trailer suspension slider is moved forward closer to the tractor, the weight is shifted from the tractor to the trailer such that the trailer axle load weight becomes heavier and the tractor axle weight becomes lighter. When the trailer suspension is moved backward away from the tractor, the weight is shifted from the trailer to the tractor such that he trailer axle load weight becomes lighter and the tractor axle weight becomes heavier. In this scenario, more cargo may be loaded onto the trailer without exceeding the weight limits on each axle assembly of the trailer. Typically, the operator must move the suspension back and forth to evenly distribute the weight in order to meet the compliance of the maximum axle load weight. Moving the suspension slider for the tandem axle assembly back and forth typically involves several steps and considerable time.

Vehicle air suspension systems are known for controlling the ride characteristics of the vehicle. The air suspension assembly is typically coupled between a frame of the trailer and an axle of the trailer and is designed for absorbing shock from the axle of the trailer. The suspension assembly includes an air spring assembly for damping movement of an associated axle of the trailer when the trailer is traveling over a surface. The air spring assembly may be pneumatically controlled by the driver to control the ride characteristics of the trailer when the trailer is being pulled along the road surface. Typically, the air suspension system of a tandem axle assembly is configured such that the weight of the load on the tandem axle assembly is equally distributed between the two axle assemblies (i.e., the front axle assembly and the rear axle assembly). Equal distribution of the weight of the load on the tandem axle assembly between the two axle assemblies may operate to improve breaking and/or minimize tire wear.

SUMMARY

The present invention may comprise one or more of the features recited in the attached claims, and/or one or more of the following features and combinations thereof.

An air suspension system of a tandem axle assembly for a trailer includes a front air spring configured to be coupled to a front axle assembly of the tandem axle assembly, a rear air spring configured to be coupled to a rear axle assembly of the tandem axle assembly, and an air reservoir in fluid communication with the front air spring and the rear air spring. A ratio valve of the air suspension system is in fluid communication with the air reservoir, the front air spring, and the rear air spring. The ratio valve is positioned between the air reservoir and the front air spring. Further, the ratio valve is selectively operable to send a lesser amount of air from the air reservoir to the front air spring than to the rear air spring.

In one illustrative embodiment, the air pressure to the front air spring may be reduced by approximately 50%.

In another illustrative embodiment, the air suspension system may also include a control valve in fluid communication with the air reservoir, the front air spring, and the rear air spring. Further, the control valve may be positioned between the air reservoir and the front air spring. Illustratively, the control valve may be movable between a first position wherein the ratio valve operates to send the lesser amount of air from the air reservoir to the front air spring than to the rear air spring, and a second position wherein the air from the air reservoir is equally distributed between the front and rear air springs. Further illustratively, air may not flow through the control valve when the control valve is in the second position and air may flow through the control valve and to the ratio valve when the control valve is in the first position.

In another illustrative embodiment, the air suspension system may include an air conduit between the ratio valve and the control valve.

According to another aspect of the present disclosure, a tandem axle assembly configured to be coupled to a storage container of a trailer includes a front axle assembly, a rear axle assembly, and an air suspension system coupled to the front and rear axle assemblies. Illustratively, wherein the air suspension system includes (i) a front air spring coupled to the front axle assembly, and (ii) a rear air spring coupled to the rear axle assembly. The air suspension system is configured to have a first mode of operation wherein the air pressure to the front and rear air springs is generally equally distributed, and a second mode of operation wherein the air pressure to the front air spring is different than the air pressure to the rear air spring.

In one illustrative embodiment, the air pressure to the front air spring may be less than the air pressure to the rear air spring in the second mode of operation. In particular, the air pressure to the front air spring may be approximately 50% of the air pressure to the rear air spring.

In another illustrative embodiment, a load on the tandem axle assembly may be distributed such that the rear axle assembly bears a greater portion of the load than the front axle assembly when the air suspension system is in the second mode of operation. Further illustratively, the resultant load on the tandem axle assembly may be positioned closer to the rear axle assembly than the front axle assembly when the air suspension system is in the second mode of operation. In particular, the rear axle assembly may support approximately 60% of the load on the tandem axle assembly and the front axle assembly may support approximately 40% of the load on the tandem axle assembly when the air suspension system is in the second mode of operation.

In still another illustrative embodiment, the air spring suspension system may also include an air reservoir and a ratio valve coupled to an air conduit of the air spring suspension system and positioned between the front air spring and the air reservoir. Illustratively, the air spring suspension system may also include a control valve in direct fluid communication with the ratio valve and the air reservoir. Illustratively, the control valve may include a lever adjustable between an ON position wherein the trailer is in the second mode of operation and an OFF position wherein the trailer is in the first mode of operation. Further illustratively, air flow between the control valve and the ratio valve may be prevented when the control valve is in the OFF position.

According to still another aspect of the present disclosure, a trailer configured to be towed by a tractor includes a storage container and a tandem axle assembly coupled to the storage container. The tandem axle assembly includes a front axle assembly, a rear axle assembly, and, an air suspension system. The air suspension system includes (i) a front air spring coupled to the front axle assembly, (ii) a rear air spring coupled to the rear axle assembly, (iii) an air reservoir, (iv) a ratio valve fluidly coupled to the air reservoir and the front and rear air springs, and (v) a control valve fluidly coupled to the ratio valve, the air reservoir, and the front and rear air springs. Illustratively, the control valve is movable between a first position wherein air from the air reservoir is able to travel through the control valve to the ratio valve, and a second position wherein air from air reservoir is not able to travel through the control valve. Further illustratively, the air pressure in the front air spring is approximately 50% of the air pressure in the rear air spring when the control valve is in the first position.

DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other mobile or stationary storage containers, as well as refrigerated and un-refrigerated trailers or storage containers, which include a tandem axle assembly having an air suspension system. Accordingly, those skilled in the art will appreciate that the present invention may be implemented in a number of different applications and embodiments and is not specifically limited in its application to the particular embodiments depicted herein.

Figure 1:
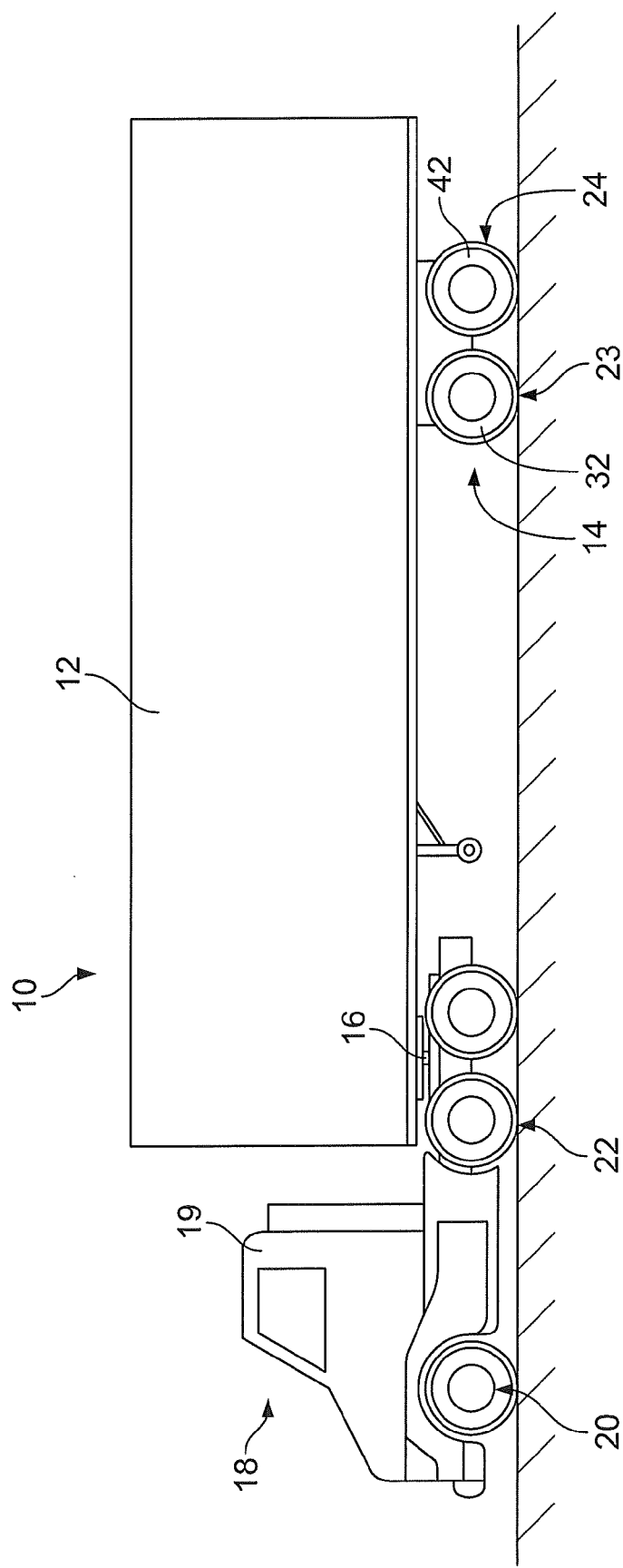
FIG. 1 is a side view of a tractor and a trailer of the present disclosure coupled to the tractor and having a tandem axle assembly.

A trailer 10 of the present disclosure includes a storage container 12, a tandem axle assembly 14 coupled to a rear portion of the storage container 12, and a kingpin 16, or conventional trailer hitch, coupled to a front portion of the storage container 12, as shown in FIG. 1. Illustratively, the trailer 10 is coupled to a towing vehicle, such as the illustrative tractor 18 also shown in FIG. 1 via the kingpin 16. The tractor 18 illustratively includes a front axle assembly 20 and a rear axle assembly 22 below the kingpin 16 of the trailer 10. The tandem axle assembly 14 of the trailer 10 includes a front axle assembly 23, a rear axle assembly 24, and an air suspension system 26 coupled to the front and rear axle assemblies 23, 24. The air suspension system 26 of the present disclosures operates to dampen the movement of the front and rear axle assemblies 23, 24 when the trailer is traveling over a surface. As is discussed in greater detail below, the air suspension system 26 further operates to transfer weight carried by the tandem axle assembly 14 to the tractor 18 such that the tractor load weight becomes heavier and the trailer load weight becomes lighter.

Illustratively, the tandem axle assembly 14 of the trailer 10 may be moved forward and backward relative to the storage container 12 in order to distribute the cargo weight between the tandem axle assembly 14 of the trailer 10 and the axle assemblies 20, 22 of the tractor 18. Further, the kingpin 16 may also be moved forward or backward relative to the storage container 10 in order to change the weight distribution of the cargo within the storage container 12 as applied to the rear axle group 22 of the tractor 18 and the tandem axle assembly 14 of the trailer 10.

In particular, when the tandem axle assembly 14 of the trailer 10 is moved forward (closer to the tractor 18), the weight of the cargo is shifted from the tractor 18 to the trailer 10 such that the load on the tandem axle assembly 14 is increased and the load on the rear tractor axle assembly 22 becomes lighter. When the tandem axle assembly 14 of the trailer 10 is moved backward away from the tractor 18, the weight is shifted from the trailer 10 to the tractor 18 such that the load on the tandem axle assembly 14 is decreased and the load on the tractor axle assembly 22 becomes heavier. Similarly, when the kingpin 16 is moved forward, the weight is shifted from the tractor 18 to the trailer 10 such that the load on the tandem axle assembly 14 is increased and the load on the rear tractor axle assembly 22 is decreased. When the kingpin 16 is moved backward, the weight is shifted from the trailer 10 to the tractor 12 such that the load on the tandem axle assembly 14 is decreased and the load on the rear tractor axle group 22 is increased.

By moving the tandem axle assembly 14 and/or the kingpin 16 back and forth along the length of the storage container 12, the cargo weight may be distributed between the rear tandem axle assembly 14 of the trailer and the rear axle assembly 22 of the tractor 18 in order to prevent any one axle assembly 22, 23, 24 from exceeding any predetermined maximum weight limit which may be set by one or more government agencies, for example. Accordingly, shifting the weight of the cargo load within the storage container 12 from the tandem axle assembly 14 to the tractor axle assembly 22 may allow an operator to increase the overall load (i.e, cargo within the storage container 12) without exceeding any predetermined government regulated maximum weight limit on the individual axle assemblies of the tandem axle assembly 14. Oftentimes, however, the trailer operator is prevented from moving the tandem axle assembly 14 rearward along the length of the trailer 10 due to various state or federal laws and/or regulations which govern the spacing between various components of the trailer 10. In particular, California trailers may not exceed a maximum distance of approximately 40 feet between the kingpin 16 and the rear axle assembly 24 of the tandem axle assembly 14 of the trailer 10. This restriction often results in the tandem axle assembly 14 being overweight by a cargo load that would be permissible if the distance between the kingpin 16 and the tandem axle assembly 14 were able to be increased. In other words, the load seen by the tandem axle assembly 14 may be over the predetermined maximum weight limit and the operator may be forced to remove cargo from within the storage container 12 in order to lighten the load on the tandem axle assembly 14 since moving the tandem axle assembly 14 rearwardly beyond the government regulated maximum distance is prohibited.

While moving the tandem axle assembly 14 rearwardly operates to shift a portion of the load seen by the tandem axle assembly 14 to the kingpin 16 of the trailer, and thus to the tractor 18, the air suspension system 26 of the present disclosure similarly operates to transfer weight carried by the tandem axle assembly 14 to the kingpin 16 of the trailer 10 without the need to move the tandem axle assembly 14 rearwardly relative to the storage container 12 of the trailer. In particular, and as is discussed in greater detail below, the air suspension system 26 operates to change the pressure ratio between the front and rear axle assemblies 23, 24. Specifically, the air suspension system 26 operates to lower the air pressure to air springs associated with the front axle assembly 23 of the tandem axle assembly 14. Thus, the air pressure within the air springs associated with the front axle assembly 23 is lower than the air pressure within the air springs associated with the rear axle assembly 24. This uneven air pressure distribution between the two axle assemblies 23, 24 operates to proportionally increase the amount of load that is carried by the rear axle assembly 24 as compared to the amount of load that is carried by the front axle assembly 23, thus moving the location of the resultant load on the tandem axle assembly 14 rearwardly. This rearward movement of the location of the resultant load on the tandem axle assembly 14 then operates to transfer weight from the tandem axle assembly 14 to the tractor 18 via the kingpin 16 similar to when the tandem axle assembly 14 is moved rearwardly. Accordingly, the air suspension system 26 of the present disclosure allows weight to be transferred to the kingpin 16, and thus to the rear axle group 22 of the tractor 18, without changing the distance between the kingpin 16 and the tandem axle assembly 14. Thus, the air suspension system 26 of the present disclosure provides that additional cargo is able to be carried by the trailer 10 without exceeding the maximum weight limit on the tandem axle assembly 14 as a whole or on each axle assembly 23, 24 individually. As is discussed in greater detail below in an illustrative example where the tandem axle assembly 14 is overweight and cannot be moved rearwardly due to local government regulations or because the tandem axle assembly is not on a slide, some of the weight on the tandem axle assembly 14 is shifted to the tractor 18 in order to keep the load on the axle assemblies 23, 24 within the prescribed limits. Thus, additional weight is able to be carried by the trailer 10 while preventing an operator from having to move the tandem axle assembly 14 rearwardly, which can oftentimes be an onerous and time consuming process.

The air suspension system 26 of the present disclosure operates to eliminate or lessen a trailer overweight condition by lessening the amount of weight carried by the tandem axle assembly 14. In particular, the air suspension system 26 of the present disclosure operates to transfer approximately 324 lbs of the weight of the cargo load within the storage container 12 from the tandem axle assembly 14 through the kingpin 16 of the trailer 10 to the tractor 18. As such, the weight on the tandem axle assembly 14 is lowered, thus allowing more cargo to be carried by the trailer 10 than without the air suspension system 26 and without moving the tandem axle assembly 14 rearwardly. It should be understood that while the illustrative air suspension system 26 operates to transfer approximately 324 lbs from the tandem axle assembly 14 to the tractor 18, it is within the scope of this disclosure to provide an air suspension system 26 that may be configured to transfer more or less weight from the tandem axle assembly 14 to the tractor 18.

As noted above, the tandem axle assembly 14 includes the front and rear axle assemblies 23, 24. Illustratively, the front axle assembly 23 includes an axle bar 30, wheels 32 attached to each end of the axle bar 30, and a frame mounting assembly (not shown) configured to mount the axle bar 30 to the frame (i.e., undercarriage (not shown)) of the storage container 12. Similarly, the rear axle assembly 24 includes a rear axle bar 40, wheels 42 attached to each end of the axle bar 40, and a frame mounting assembly (not shown) configured to mount the axle bar 40 to the frame of the storage container 12. The air suspension system 26 is coupled to the front and rear axle assemblies 23, 24 and includes first and second front axle air springs 50, 52 coupled to the front axle bar 30. The first and second front axle air springs 50, 52 may be coupled to the front axle bar 30 by any number of conventional components and/or devices. The air suspension system 26 further includes first and second rear axle air springs 54, 56 coupled to the rear axle bar 40. Similar to the first and second front axle air springs 50, 52, the first and second rear axle air springs 54, 56 may be coupled to the rear axle bar 40 by any number of conventional components and/or devices including, for example.

Figure 2:
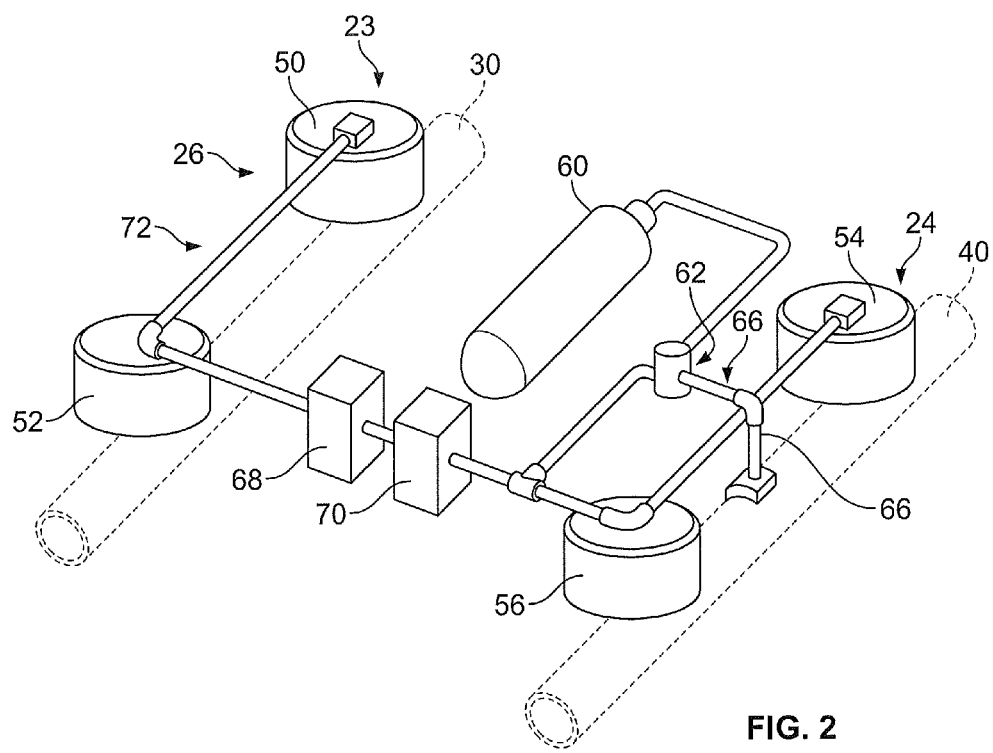
FIG. 2 is a diagrammatic, perspective view of the air suspension system of the tandem axle assembly of the trailer of FIG. 1.
Figure 3:
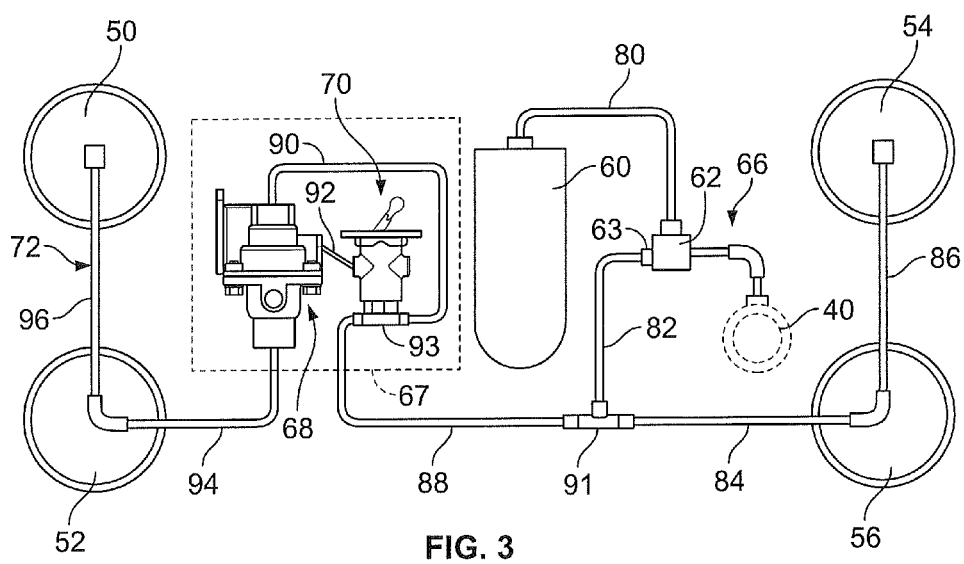
FIG. 3 is a diagrammatic, plan view of the air suspension system shown in FIG. 2.
Figure 5:
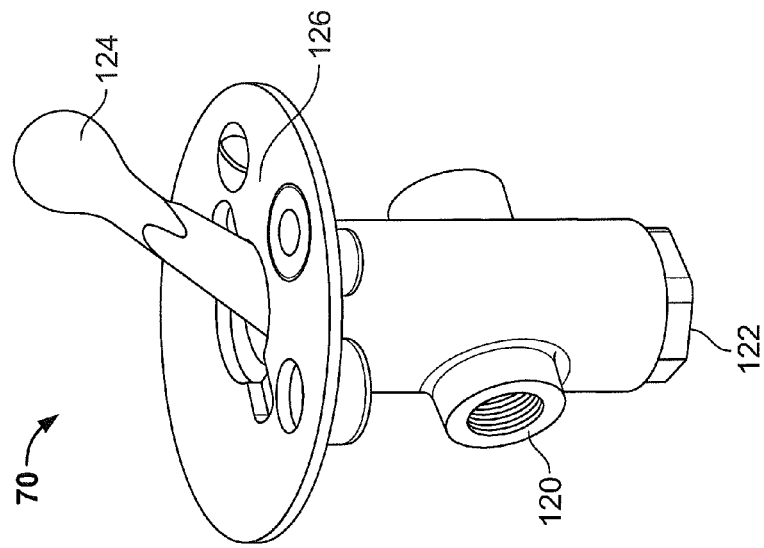
FIG. 5 is a perspective view of a control valve of the air suspension system of the present disclosure.

The air suspension system 26 further includes an air reservoir 60, a height control valve 62, a height control arm 66, and a biasing system 67 including a ratio valve 68 and a control valve 70, as shown schematically in FIGS. 2 and 3, for example. The biasing system 67 operates to distribute the air from the air reservoir 60 to the front and rear air springs 50, 52 and 54, 56. As is discussed in greater detail below, the biasing system 67 is selectively operable in an OFF position whereby the air is evenly distributed between the front and rear air springs 50, 52 and 54, 56 and an ON position whereby the air is unevenly distributed between the front and rear air springs 50, 52 and 54, 56. In the ON position, the air pressure within the front air springs 50, 52 is lower than the air pressure within the rear air springs 54, 56. The air suspension system 26 further includes an air conduit system 72 including a plurality of air conduits 80, 82, 84, 86, 88, 90, 92, 94, 96 interconnecting the above-referenced components of the air suspension system 26. Illustratively, the air reservoir 60 is fluidly coupled to the height control valve 62 via the conduit 82 of the air conduit system 72. The height control arm 66 is coupled to the height control valve 62 at one end and is coupled to the rear axle 40 at the other end. As is typical, the height control valve 62 and the height control arm 66 cooperate to allow the operator to adjust the height of the air suspension and to maintain the air suspension at that level. The height control valve 62 is in fluid communication with the front and rear air springs 50, 52, 54, 56 via a number of the aforementioned air conduits 80, 82, 84, 86, 88, 90, 92, 94, 96 of the air conduit system 72.

In particular, the air conduit 80 operates to fluidly connect the air reservoir 60 with the height control valve 62. The air conduit 82 is coupled to the exit port 63 of the height control valve 62 and to a first T-connector 91 of the air conduit system 72. A first exit port of the T-connector 91 is coupled to the air conduit 84 in order to fluidly couple the height control valve 62 with one of the rear air springs 56 of the air spring suspension system 26. The rear air springs 54, 56 are fluidly coupled to each other via the air conduit 86. As such, the height control valve 62 is fluidly coupled to the rear air springs 54, 56 via the air conduits 82, 84, and 86.

Figure 6:
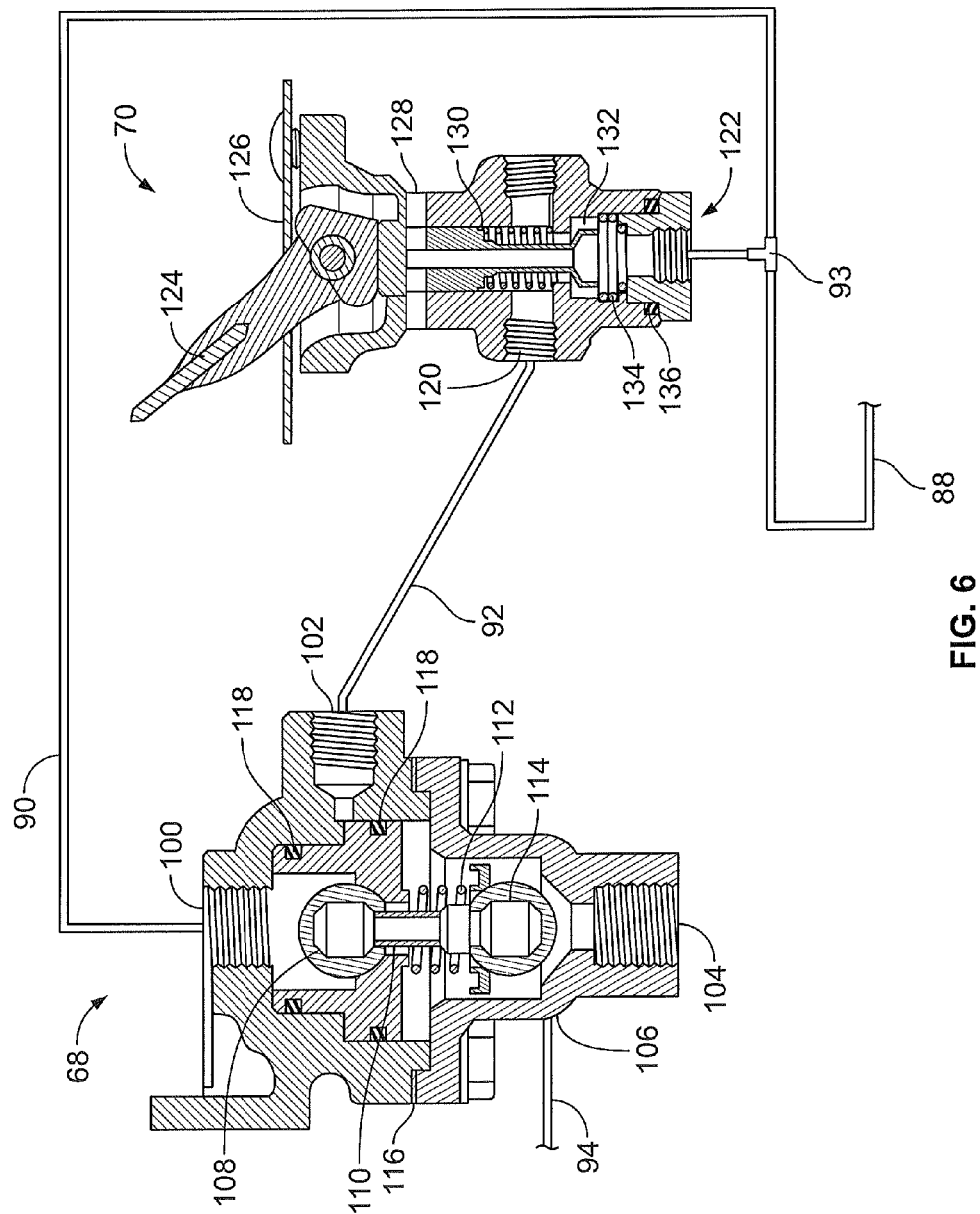
FIG. 6 is a sectional view of the ratio and control valves of FIGS. 4 and 5 schematically showing the air conduits of the air suspension system connecting the ratio and control valve together.

A second exit port of the T-connector 91 is coupled to the air conduit 88 in order to fluidly couple the height control valve 62 with the control valve 70 of the biasing system. As shown in FIGS. 3 and 6, the air suspension system 26 further includes a second T-connector 93 coupled to an inlet port 122 of the control valve 70. The air conduit 88 fluidly couples the first and second T-connectors 91, 93 to each other while one end of another air conduit 90 is received within the second T-connector 93 in order to fluidly couple the inlet port 122 of the control valve 70 with the ratio valve 68. As is discussed in greater detail below, the ratio valve 68 is also fluidly coupled to the control valve 70 via the air conduit 92, as shown in FIGS. 3 and 6. The air conduit 94 of the system 72 operates to fluidly couple the delivery port 106 of the ratio valve 68 and the second front air spring 52. The first and second front air springs 50, 52 are fluidly coupled to each other via the air conduit 96 of the air suspension system 26. It should be noted that while the particular air conduit system 72 is shown and described herein, any suitable air conduit system including one or more air conduits and conduit connectors such as the illustrative T-connectors 91, 93 may be used in order to fluidly couple the components of the air suspension system 26, including the front and rear air springs 50, 52 and 54, 56, the air reservoir 60, the height control valve 62, and the ratio and control valves 68, 70 of the biasing system 67 to each other.

Illustratively, the biasing system 67, including the ratio valve 68 and the control valve 70, is positioned in-line between the front air springs 50, 52 and the rear air springs 54, 56. The ratio valve 68 may be mounted to a slider bogie (not shown) of the tandem axle assembly 14 and the control valve may be mounted to the front of the subframe (not shown) of the trailer 10 or within the tractor cab 19 for access when the reduction in air pressure to the front air springs 50, 52 associated with the front axle assembly 23 is needed. In particular, the biasing system 67 is positioned between the first T-connector 91 and the front air spring 52 associated with the front suspension assembly 23. In other words, the biasing system 67 is positioned between the front air springs 50, 52 and the air reservoir 60 in order to selectively ratio the air pressure within the front air springs 50, 52 when the air pressure of the front air springs 50, 52 is reduced, the weight distribution of the portion of the cargo or load within the storage container 12 carried by the tandem axle assembly 14 is altered such that the load is not equally distributed between each of the front and rear axle assemblies 23, 24 of the tandem axle assembly 14. In particular, a greater portion of the load on the tandem axle assembly 14 is carried by the rear axle assembly 24. Accordingly, the location of the resultant load of the weight of the cargo carried by the tandem axle assembly 14 is moved rearwardly from its typical location equidistant between the front and rear axle assemblies 23, 24 when the air pressure to the front and rear air springs 50, 52 and 54, 56 is generally equal. Thus, the rearward movement of the location of the resultant load on the tandem axle assembly 14 operates to shift some of the weight from the tandem axle assembly 14 through the kingpin 16 and to the tractor 18.

Illustratively, the ratio valve 68 operates to ratio the amount of air between the front and rear axle assemblies 23, 24. In particular, the ratio valve 68 operates to reduce the air pressure to the front air springs 50, 52 associated with the front axle assembly 23 by approximately 50%. Illustratively, the ratio valve 68 of the biasing system 67 is the Bendix® LQ-2™ Limiting & Quick Release Valve commercially available from Bendix Commercial Vehicle Systems LLC (Elyria, Ohio). However, it should be understood that other suitable valves capable of reducing the air pressure to the front air springs 50, 52 associated with the front axle assembly 23 may be used as well.

Further illustratively, the control valve 70 is positioned between the air reservoir 60 and the front air spring 52 of the front axle assembly 22. Specifically, the control valve 70 is coupled to the ratio valve 68, as shown schematically in FIG. 3 and more particularly in FIG. 6, and is positioned between the ratio valve 68 and the first T-connector 91. Illustratively, the control valve 70 is the Bendix® TW-1™ Control Valve commercially available from Bendix Commercial Vehicle Systems LLC (Elyria, Ohio). However, it should be understood that other suitable valves capable of controlling the flow of air through the ratio valve 68 may be used as well.

In use, as is described in greater detail below, the control valve 70 controls the flow of air through the ratio valve 68 and is manually operable by the tractor/trailer operator between an ON and OFF position in order to selectively place the ratio valve 68 in the ON position or the OFF position. Thus, the control valve 70 allows the operator to turn the biasing system 67 on or off as needed. When the control valve 68 is in the first, ON position, the ratio valve 68 operates to reduce air pressure to the front air springs 50, 52 associated with the front axle assembly 23. With reduced air pressure in the front air springs 50, 52 associated with the front axle assembly 23, the load on the tandem axle assembly 14 is unequally distributed between the front and rear axle assemblies 23, 24 such that the load seen by the front axle assembly 23 is less than that seen by the rear axle assembly 24. Thus, the location of the resultant load on the tandem axle assembly 14 is moved rearwardly closer to the rear axle assembly 24 thus causing a portion of the load to shift to the kingpin 16 to be carried by the tractor 18. In the second, OFF position, there is no reduction of air to either the front or rear air springs 50, 52 and 54, 56. Thus, the load seen by the front and rear axle assemblies 23, 24 of the tandem axle assembly 14 is generally equal and the location of the resultant load on the tandem axle assembly 14 is generally positioned equidistantly between the front and rear axle assemblies 23, 24.

Figure 4:
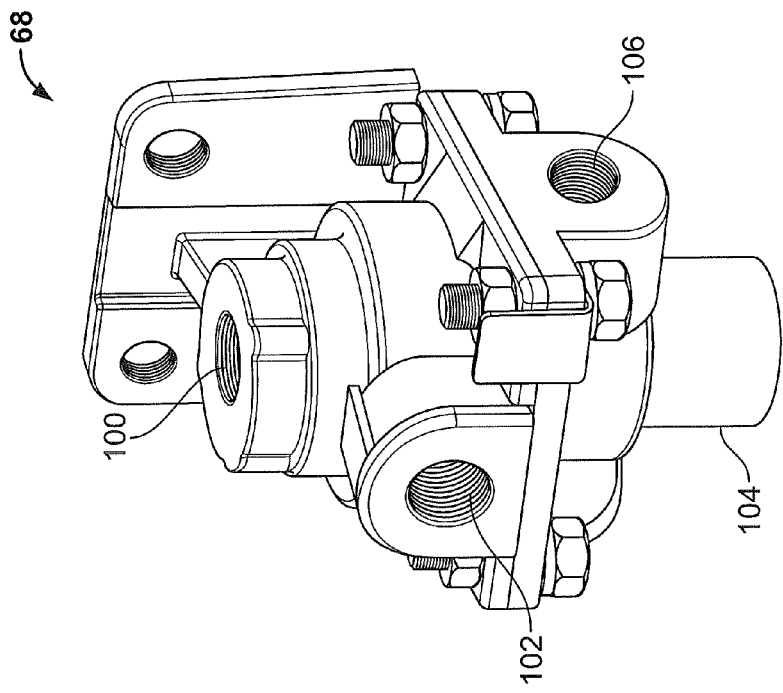
FIG. 4 is a perspective view of a ratio valve of the air suspension system of the present disclosure.

Illustratively, a shown in FIGS. 4 and 6, the ratio valve 68 includes a supply port 100, a cut-out valve port 102, an exhaust port 104, and a delivery port 106. The ratio valve 68 further includes an inlet valve 108, a stem 110, a spring 112, an exhaust valve 114, a gasket 116, and various O-rings 118, as shown in FIG. 4. The control valve 70 includes a delivery port 120 and an inlet port 122. The control valve 70 further includes a lever 124, a dial 126, an exhaust port 128, a plunger 130, an inlet and exhaust valve 132, an inlet valve spring 134, and a seal ring 136.

As shown in FIG. 6, the cut-out valve port 102 of the ratio valve 68 is fluidly coupled to one side of the delivery port 120 of the control valve 70 via the air conduit 92. The other side of the delivery port 120 of the control valve 70 is illustratively plugged closed. The supply port 100 of the ratio valve 68 is in fluid communication with the inlet port 122 of the control valve 70 via the air conduit 90 of the air suspension system 26. The inlet port 122 of the control valve 70 is also in fluid communication with the height control valve 62 adjacent the air reservoir 60. In particular, the second T-connector 93 is coupled to the inlet port 122 of the control valve 70, such that the inlet port 122 of the control valve 70 both receives air from the air reservoir 60 via the air conduit 88 while air from the air reservoir 609is also passed to the supply port 100 of the ratio valve 68 via the air conduit 90. The delivery port 106 of the ratio valve is fluidly coupled to the front axle air springs 50, 52 via the air conduit 94.

In operation, air from the air reservoir 60 is fed into the front and rear axle springs 50, 52, 54, 56 in order to dampen the movement of the respective axle assemblies 23, 24 coupled thereto. In particular, air from the air reservoir 60 is fed into the height control valve 62 via the conduit 80 which determines, based at least in part from feedback from the height control arm 66 how much air to send through the air conduit 82 to the front and rear air springs 50, 52, 54, 56 in order to appropriately dampen the movement of the front and rear axle assemblies 23, 24 when the trailer 10 is traveling over a surface. As noted above, the first T-connector 91 is fluidly coupled to the air conduit 82 from the outlet port 63 of the height control valve 62 in order to send air to both the front air springs 50, 52 and the rear air springs 54, 56. In particular, the air conduit 84 coupled to the first T-connector 91 sends air to the rear air springs 54, 56 while the air conduit 88 also coupled to the first T-connector 91, sends air to the front air springs 50, 52. First, however, the air from the air conduit 88 travels through the biasing system 67 including the ratio and control valves 68, 70.

When the lever 124 of the control valve 70 is in the OFF position, as shown in FIG. 6, air is permitted to pass through the control valve 70 and into the ratio valve 68. As such, air flows through the control valve 70 and enters the side, cut-out valve port 102 of the ratio valve 68 via the air conduit 92. At the same time, air also enters the top, supply port 100 of the ratio valve 68 via the air conduit 90. Thus, pressure acts upon the top and side areas of the stem 110, moving the stem 110 down against the bias of the spring 112, seating the exhaust valve 114, and closing the exhaust port 104. At the same time, the inlet valve 108 opens and air is delivered through the delivery port 106 to the front air springs 50, 52. When the air pressure beneath the stem 110 and in the delivery conduit 94 equals the air pressure being delivered from the air reservoir 60, the stem 110 raises slightly and closes the inlet valve 108. When the application of air from the air reservoir 60 is released, the air on the top and side areas of the stem 110 is exhausted. Air pressure beneath the stem 110 raises the stem 110, and the exhaust valve 114 opens to allow the air in the delivery line 94 to exhaust out the exhaust port 104. Accordingly, the air from the air reservoir 60 is equally distributed between the front and rear axle air springs 50, 52 and 54, 56 such that a load from the storage container 12 on the tandem axle assembly 14 is equally distributed between the front axle air springs 50, 52 and the rear axle air springs 54, 56.

With the lever 124 of the control valve 70 in the ON position (not shown), the inlet valve 132 is seated and the exhaust port 128 of the control valve 70 is open. In this position, air is not permitted to pass through the control valve 70. Thus, air from the air reservoir 60 enters only the top, supply port 100 of the ratio valve 68. Air does not enter the side, cut-out valve port 102 of the ratio valve 68 because the control valve 70 is OFF. Air pressure is effectively only provided on the upper inner area of the stem 110 of the ratio valve 68. As such, the stem 110 moves down and the exhaust valve 114 seats and the inlet valve 108 opens. Air pressure in the delivery conduit 94 acts on the lower area of the stem 110 which is about twice the size of the upper inner area of the stem 110. Thus, when the pressure acting upon the lower area of the stem 110 is about half of the delivered pressure from the air reservoir 60, the stem 110 lifts and closes the inlet valve 108. In this position, the air pressure in the front air springs 50, 52 is approximately 50% of the application air pressure from the air reservoir. Due to the unequal air pressure between the front air springs 50, 52 and the rear air springs 54, 56, the load seen by the tandem axle assembly 14 is unevenly distributed between the front axle air springs 50, 52 and the rear axle air springs 54, 56. In particular, when the control valve 70 is in the ON position, the load is distributed such that the rear axle air springs 54, 56 bear a load greater than that seen by the front axle air springs 50, 52. This increase in load to the rear axle air springs 54, 56 operates to move the overall applied load from the storage container 12 on the tandem axle assembly 14 rearwardly, thus transferring some of the load carried by the tandem axle assembly 14 to the rear axle group 22 of the tractor 18 through the king pin 16. Illustratively, the lever 124 of the control valve 70 may be moved manually by the operator of the tractor/trailer in order to move the control valve 70 to the ON and OFF positions. It should further be understood, however, that a biasing system may be provided whereby the control valve may be automatically moved to the ON and OFF positions by pushing an ON/OFF button electrically coupled to the biasing system 67, for example.

Figure 7:
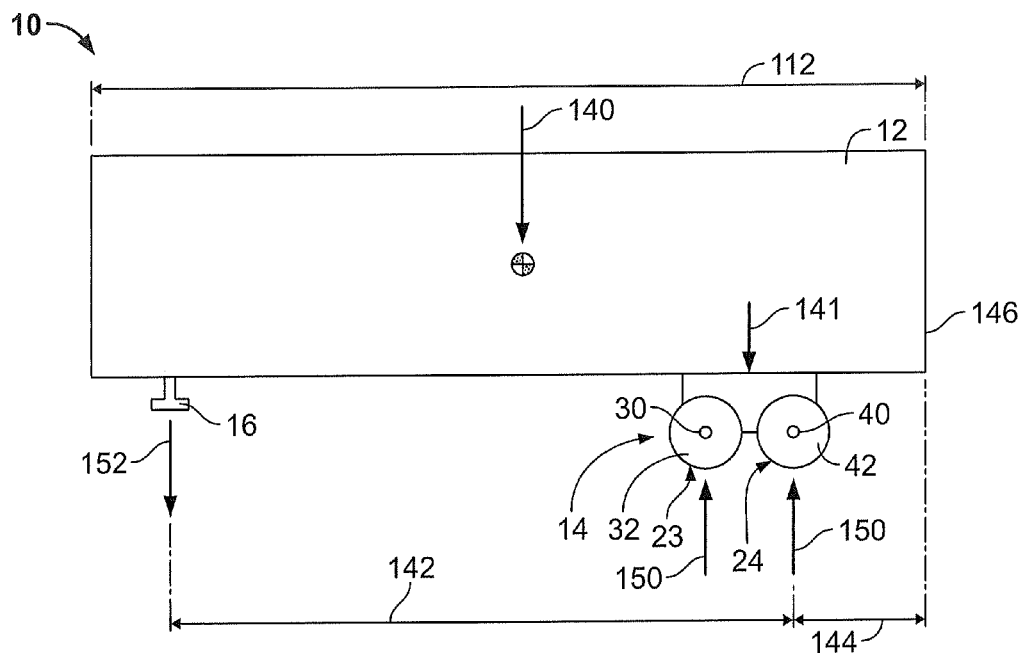
FIG. 7 is a side, schematic view of the trailer of FIG. 1 illustratively showing a load on the tandem axle assembly generally evenly distributed between the front and rear axle assemblies of the tandem axle assembly due to equal air distribution between front and rear air springs of the air suspension system of the tandem axle assembly.
Figure 8:
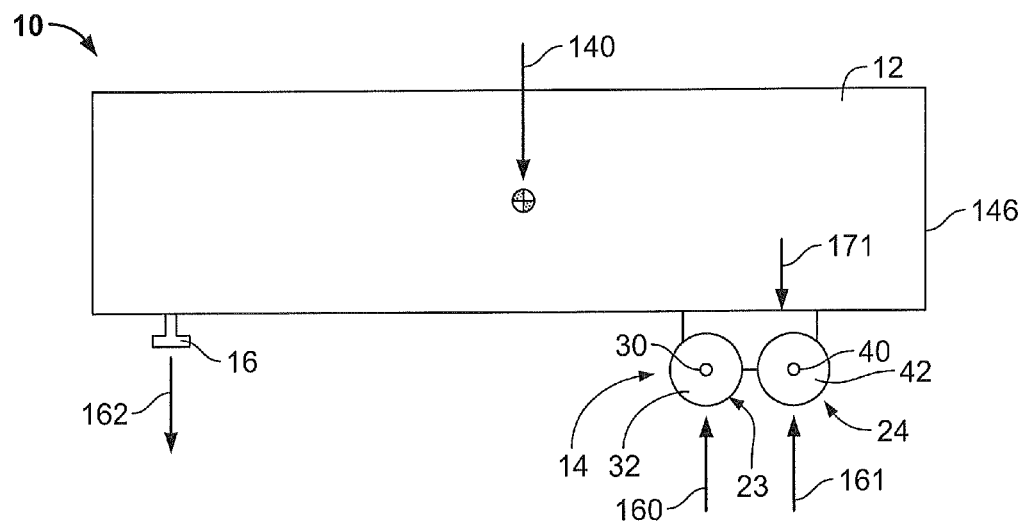
FIG. 8 is a side, schematic view of the trailer of FIG. 7 showing a load on the tandem axle assembly unevenly distributed between the front and rear axle assemblies of the tandem axle assembly due to unequal air distribution between the front and rear air springs of the air suspension system such that a greater amount of the weight of the load on the tandem axle assembly is carried by the rear axle assembly thus shifting some of the weight of the load from the tandem axle assembly to the kingpin of the trailer to be carried by the tractor.

In one illustrative example shown in FIGS. 7 and 8, a trailer 10 having an overall length 112 of 53 feet is provided. Illustratively, the spacing 142 between the kingpin 16 and the rear axle assembly 24 of the tandem axle assembly 14 is approximately 40 feet in order to comply with various government regulations, such as, for example, the aforementioned California regulations. Further illustratively, the spacing 144 between the rear axle bar 40 and the rear end 146 of the storage container 12 is approximately 10 feet on a fifty-three foot trailer, such as the illustrative trailer 10. An illustrative applied load 140 of L1 lbs is shown. When the control valve 70 is in the OFF position such that the air pressure to the front air springs 50, 52 and the rear air springs 54, 56 is generally equal, the tandem load 141 carried by the tandem axle assembly 14 is equally distributed between the front and rear axle assemblies 23, 24. Accordingly, the location of the resultant tandem load 141 is equidistantly positioned between the front and rear axle assemblies 23, 24, as shown in FIG. 7, such that each of the front and rear axle assemblies 23, 24 supports an equal illustrative load of approximately 17,150 lbs. In other words, the load seen at the ground below each of the front and rear axle assemblies 23, 24 is generally equal. Accordingly, in this illustrative example, the load 141 on the tandem axle assembly 14 is 34,300 lbs and is, therefore 300 lbs over the maximum legal load limit of 34,000 lbs for a tandem axle assembly having two axle assemblies. Illustratively, a load 152 of approximately L2 lbs is distributed through the kingpin 16 to the rear axle group 22 of the tractor 18, as shown in FIG. 7.

When the control valve 70 is in the ON position, as shown in FIG. 8, in order to bias (or unevenly distribute) the load between the front and rear axle assemblies 23, 24 of the tandem axle assembly 14, the air pressure to the front air springs 50, 52 is approximately 50% of the air pressure delivered from the air reservoir 60 and thus is also 50% of the air pressure to the rear air springs 54, 56. This reduced air pressure to the front air springs 50, 52 causes the weight distribution between the front and rear axle assemblies 23, 24 to be unequal. Particularly, the reduced air pressure to the front air springs 50, 52 causes the weight distribution to shift rearwardly such that more weight is carried on the rear axle group 24 than the front axle group 23.

Illustratively, as shown in FIG. 8, the front axle assembly 23 supports a load 160 of approximately 14,000 lbs while the rear axle assembly 24 supports a load 161 of approximately 20,000 lbs and the kingpin 16 supports a load 162 of approximately (L2+300) lbs. Thus, in the this illustrative example, when the control valve is in the ON position, approximately 300 lbs of the total load on the tandem axle assembly 14 is shifted to the kingpin 16 without the need to move the tandem axle assembly 14 to change the distance between the kingpin 16 and the tandem axle assembly 14. Thus, in the ON position, the total load 171 on the tandem axle assembly 14 is approximately 34,000 lbs and is within the legal load limit for a tandem axle assembly having two axle assemblies. Further, the loads 160, 161 on each of the front and rear axle assemblies 23, 24 do not exceed the 20,000 lb maximum load limit for a single axle assembly.

As noted above, the total load 171 on the tandem axle assembly 14 is 34,000 lbs. Further, the location of the resultant load 171 on the two axle assemblies 23, 24 is moved rearwardly closer to the rearward axle assembly 24. Thus, some of the weight on the tandem axle assembly 14 is transferred to the kingpin 16. Similar to moving the tandem axle assembly 14 rearwardly in order to shift some of the weight on the tandem axle assembly 14 to the kingpin 16, unevenly distributing the air pressure in the air springs 50, 52, 54, 56 such that the front air springs 50, 52 receive approximately 50% less air pressure causes the location of the resultant load 171 on the tandem axle assembly 14 to move rearwardly. In the illustrative example shown in FIG. 8, for example, the load 160 on the front axle assembly 23 is approximately 14,000 lbs while the load 161 on the rear axle assembly 24 is approximately 20,000. A load 162 of (L2+300) lbs on the kingpin 16 is now approximately 300 lbs greater than the previous load 152 of L2 lbs on the kingpin 16, as shown in FIG. 7. Thus approximately 300 lbs of weight carried evenly by the front and rear axle groups 23, 24 shown in FIG. 7 when the control valve is in the OFF position, is transferred to the kingpin 16 when the control valve is moved to the ON position, as shown in FIG. 8. Thus, the total load 171 carried on the tandem axle assembly 14 shown in FIG. 8 is less than that which was carried on the tandem axle assembly 14 shown in FIG. 7.

It should be understood that the example set forth in FIGS. 7 and 8 is illustrative only and that the numbers used therein are for illustrative purposes only. In particular, when the biasing system 67 of the present disclosure is in the ON position, approximately 324 lbs of weight is transferred from the tandem axle assembly 14 to the kingpin 16. However, it is within the scope of the present disclosure to provide a biasing system of the air suspension system that is capable of unevenly distributing the air pressure between the front and rear air springs 50, 52, 54, 56 in order to cause any amount of the load on the tandem axle assembly to be transferred to the kingpin. Accordingly, in situations where an operator discovers that the total cargo load on the tandem axle assembly 14 is over the maximum load restrictions by approximately 324 lbs, the operator may switch the control valve 70 of the present disclosure to the ON position thus redistributing the load on the front and rear axle assemblies 23, 24 such that the total load 171 on the tandem axle assembly 14, as well as on each of the front and rear axle assemblies 23, 24 does not exceed any load restrictions.

In this particular example, the ratio valve 68 has been preset to distribute the load on the tandem axle assembly 14 between the front and rear axle assembly 20, 22 such that the approximately 40% of the total load supported by the tandem axle assembly 14 is carried on the front axle assembly 23 while approximately 60% of the total load supported by the tandem axle assembly 14 is carried on the rear axle assembly 24. It should be understood, however, that the ratio valve 68 may be configured to distribute the air pressure between the front and rear air springs 50, 52, 54, 56, (thus distributing the load on the front and rear axle assemblies 23, 24) in any suitable manner such that the rear axle assembly 24 supports a greater percentage of the total load supported by the tandem axle assembly 14 than the front axle assembly 23. Further, a different ratio valve may be used to achieve a different ratio. In other words, the ratio valve 68 may be configured in any particular manner in order to distribute the load unequally between the front and rear axle assemblies 23, 24 such that the rear axle assembly 24 supports a greater load than the front axle assembly 23. Various fixed ratio valves are made that can be sized for the proper pressure reduction to have the desired pressure drop so that the weight distribution between the front and rear axle assemblies 23, 24 results in approximately 14,000 lbs carried on the front axle assembly 23 and 20,000 lbs carried on the rear axle assembly 24.

As is discussed in detail above, the biasing system 67 of the present disclosure operates to selectively unevenly distribute the air pressure from the air reservoir 60 to the front and rear air springs 50, 52 and 54, 56 of the air suspension system 26 such that the front air springs 50, 52 are maintained at approximately 50% less air pressure than the rear air springs 54, 56. This reduction in air pressure to the front air springs 50, 52 operates to unevenly distribute the weight of the load on the tandem axle assembly 14 such that a greater portion of the load on the tandem axle assembly 14 is seen by the rear axle assembly 24. Accordingly, the location of the resultant load on the tandem axle assembly 14 is moved rearwardly which operates to transfer some of the load on the tandem axle assembly 14 to the tractor 18 via the kingpin 16. Thus, in situations where the load on the tandem axle assembly 14 exceeds the maximum allowable load per various government regulations, the biasing system 67 may be moved to the ON position in order to transfer some of the weight on the tandem axle assembly 14 to the tractor 18 in order to maintain the load on the tandem axle assembly 14, and on each of the front and rear assemblies 23, 24 of the tandem axle assembly 14, within the maximum legal load limits. Illustratively, the biasing system 67 of the present disclosure operates to transfer approximately 324 lbs from the tandem assembly 14 to the tractor 18. It should be understood, however, that it is within the scope of this disclosure to provide a biasing system 67 configured to transfer more or less load from the tandem axle assembly 14 to the tractor 18. Further, while the biasing system 67 is configured to provide 50% less air pressure to the front air springs 50, 52 when in the ON position, it is within the scope of this disclosure to provide a biasing system configured to provide more or less than 50% of the air pressure to the front air springs 50, 52 when in the ON position. It is further within the scope of this disclosure to provide a ratio valve configured to be adjusted to select the amount of the air pressure reduction to the front air springs 50, 52 when the biasing system 67 is in the ON position. Accordingly, it is within the scope of this disclosure to provide any suitable biasing system 67 configured to reduce the air pressure to the front air springs 50, 52 of the air suspension system 26.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An air suspension system of a tandem axle assembly for a trailer, comprising:
   a front air spring configured to be coupled to a front axle assembly of the tandem axle assembly;
   a rear air spring configured to be coupled to a rear axle assembly of the tandem axle assembly;
   an air reservoir in fluid communication with the front air spring and the rear air spring; and
   a ratio valve in fluid communication with the air reservoir, the front air spring, and the rear air spring, the ratio valve positioned between the air reservoir and the front air spring,
   wherein the ratio valve is selectively operable to send a lesser amount of air from the air reservoir to the front air spring than to the rear air spring.

2. The air suspension system of claim 1, wherein the air pressure to the front air spring is reduced by approximately 50%.

3. The air suspension system of claim 1, further comprising a control valve in fluid communication with the air reservoir, the front air spring, and the rear air spring, wherein the control valve is positioned between the air reservoir and the front air spring.

4. The air suspension system of claim 3, wherein the control valve is movable between a first position wherein the ratio valve operates to send the lesser amount of air from the air reservoir to the front air spring than to the rear air spring, and a second position wherein the air from the air reservoir is equally distributed between the front and rear air springs.

5. The air suspension system of claim 4, wherein air does not flow through the control valve when the control valve is in the second position.

6. The air suspension system of claim 5, wherein air flows through the control valve and to the ratio valve when the control valve is in the first position.

7. The air suspension system of claim 4, further including an air conduit between the ratio valve and the control valve.

8. A tandem axle assembly configured to be coupled to a storage container of a trailer, the tandem axle assembly comprising:
   a front axle assembly;
   a rear axle assembly; and
   an air suspension system coupled to the front and rear axle assemblies, wherein the air suspension system includes:
      (i) a front air spring coupled to the front axle assembly, and
      (ii) a rear air spring coupled to the rear axle assembly,
   wherein the air suspension system is configured to have a first mode of operation wherein the air pressure to the front and rear air springs is generally equally distributed, and a second mode of operation wherein the air pressure to the front air spring is different than the air pressure to the rear air spring,
   wherein the air pressure to the front air spring is less than the air pressure to the rear air spring in the second mode of operation.

9. The tandem axle assembly of claim 8, wherein the air pressure to the front air spring is approximately 50% of the air pressure to the rear air spring.

10. The tandem axle assembly of claim 8, wherein the rear axle assembly bears a greater portion of a load on the tandem axle assembly than the front axle assembly when the air suspension system is in the second mode of operation.

11. The tandem axle assembly of claim 10, wherein the resultant load on the tandem axle assembly is positioned closer to the rear axle assembly than the front axle assembly when the air suspension system is in the second mode of operation.

12. The trailer of claim 10, wherein the rear axle assembly supports approximately 60% of the load on the tandem axle assembly and the front axle assembly supports approximately 40% of the load on the tandem axle assembly when the air suspension system is in the second mode of operation.

13. The trailer of claim 8, wherein the air suspension system further includes an air reservoir and a ratio valve coupled to an air conduit of the air suspension system and positioned between the front air spring and the air reservoir.

14. The trailer of claim 13, wherein the air suspension system further includes a control valve in direct fluid communication with the ratio valve and the air reservoir.

15. The trailer of claim 14, wherein the control valve includes a lever adjustable between an ON position wherein the trailer is in the second mode of operation and an OFF position wherein the trailer is in the first mode of operation.

16. The trailer of claim 15, wherein air flow between the control valve and the ratio valve is prevented when the control valve is in the OFF position.

17. A trailer configured to be towed by a tractor, the trailer including
   a storage container; and
   a tandem axle assembly coupled to the storage container, the tandem axle assembly including a front axle assembly, a rear axle assembly, and, an air suspension system including (i) a front air spring coupled to the front axle assembly, (ii) a rear air spring coupled to the rear axle assembly, (iii) an air reservoir, (iv) a ratio valve fluidly coupled to the air reservoir and the front and rear air springs, and (v) a control valve fluidly coupled to the ratio valve, the air reservoir, and the front and rear air springs,
   wherein the control valve is movable between a first position wherein air from the air reservoir is able to travel through the control valve to the ratio valve, and a second position wherein air from air reservoir is not able to travel through the control valve, and wherein the air pressure in the front air spring is approximately 50% of the air pressure in the rear air spring when the control valve is in the first position.

\* \* \* \* \*